(12) United States Patent
Segato et al.

(10) Patent No.: US 8,215,204 B2
(45) Date of Patent: Jul. 10, 2012

(54) CUSTOMIZABLE MODULAR HANDLE STRUCTURE FOR SPORTS EQUIPMENT

(75) Inventors: Stefano Segato, Vicenza (IT); Vincent Bourgeois, Bassano Del Grappa (IT)

(73) Assignee: Brooks England Limited, Smethwick, Birmingham (GB)

(*) Notice: Subject to any disclaimer, the term of this patent is extended or adjusted under 35 U.S.C. 154(b) by 475 days.

(21) Appl. No.: 12/307,603

(22) PCT Filed: Jul. 4, 2007

(86) PCT No.: PCT/IB2007/052623
§ 371 (c)(1),
(2), (4) Date: May 14, 2009

(87) PCT Pub. No.: WO2008/007311
PCT Pub. Date: Jan. 17, 2008

(65) Prior Publication Data
US 2009/0320639 A1  Dec. 31, 2009

(30) Foreign Application Priority Data
Jul. 7, 2006 (IT) .................. VI2006A0212

(51) Int. Cl.
*B62K 21/26* (2006.01)
(52) U.S. Cl. ............... 74/551.9; 74/543; 16/430; 38/91
(58) Field of Classification Search ............ 74/525, 74/543, 544, 551.1, 551.4, 551.9; 16/421, 16/430, 436, DIG. 12; 38/90–92; 81/177.2; 403/374.1–374.4
See application file for complete search history.

(56) References Cited

U.S. PATENT DOCUMENTS

| | | | | | |
|---|---|---|---|---|---|
| 497,519 | A | * | 5/1893 | Goddard | 74/551.9 |
| 499,103 | A | * | 6/1893 | Goddard | 74/551.9 |
| 586,830 | A | * | 7/1897 | Williams | 74/551.9 |
| 1,601,520 | A | * | 9/1926 | Forbes | 38/90 |
| 2,423,640 | A | * | 7/1947 | Dally | 30/340 |
| 2,603,260 | A | * | 7/1952 | Floren | 81/22 |
| 6,263,759 | B1 | * | 7/2001 | Hollingsworth et al. | 74/551.9 |
| 6,314,617 | B1 | * | 11/2001 | Hastings | 16/436 |

FOREIGN PATENT DOCUMENTS
DE 102004052681 A1 9/2005
GB 432248 A 7/1935
* cited by examiner

*Primary Examiner* — James Pilkington
*Assistant Examiner* — Thomas Diaz
(74) *Attorney, Agent, or Firm* — Tutunjian & Bitetto, P.C.

(57) ABSTRACT

A handle structure for sports equipment bars (B) particularly handlebars of cycles, motor cycles or the like. The structure (1) has a main tubular body (2) which defines a longitudinal axis (X), and has an outer surface (6) susceptible of being grasped by a user and an inner surface (7) designed to be operably mounted to the bar (B). A first device (3) axially locks the main body (2) to the bar (B). The tubular body (2) has a plurality of modular annular elements (10, 10', 10") designed for mutual coaxial connection along the longitudinal axis (X) for adjusting the overall length (L) of the body (2) to each user's needs. A sports implement incorporating such structure is also provided.

14 Claims, 3 Drawing Sheets

CUSTOMIZABLE MODULAR HANDLE STRUCTURE FOR SPORTS EQUIPMENT

FIELD OF THE INVENTION

The present invention finds application in the field of sport and leisure accessories, and particularly relates to a customizable modular handle structure for sports equipment.

The handle structure of the invention is particularly suitable for connection with sports equipment bars such as, without limitation, handlebars of cycles, motor cycles or the like, handlebars or barbells for weightlifting, jump-ropes, treadmills.

BACKGROUND OF THE INVENTION

Hand grip bars of sports equipment, particularly handlebars for cycles, motor cycles or the like, are known to have handles for easy grasp by a user.

These handles generally include a main body which is designed to be slideably fitted on the handlebar and locked in the desired position by clamping a pair of end elements thereon.

One drawback of these known solutions is that the size of the main body along the handlebar and of the handle as a whole is constant and cannot be changed, for example, to fit the hand sizes of two different users. As a result, if a cycle is designed to be used by several users, there is the risk that some of them cannot properly grasp the handle, and be liable to cause injuries to themselves or other road users.

Furthermore, in cycles designed for sports use, a handlebar handle having a customizable length may enhance the cyclist's performances.

A further drawback of these prior art handles is that handles having a non customizable length may be deemed to be aesthetically inconvenient, especially by demanding users.

SUMMARY OF THE INVENTION

The object of this invention is to overcome the above drawbacks, by providing a handle that is highly efficient and relatively cost-effective.

A particular object is to provide a handle having a variable length, to meet the needs of every single user.

These and other objects, as better explained hereafter, are fulfilled by an handle structure having a main tubular body that defines a longitudinal axis, and has an outer surface susceptible of being grasped by a user and an inner surface designed to be operably mounted to the bar as well as first means for axially locking the main body to the bar.

According to the invention, the tubular body has a plurality of modular annular elements suitable to be mutually coaxially coupled along the longitudinal axis.

Thanks to this particular arrangement, the handle structure of the invention allows adjustment of the overall length of the tubular grip body to each user's needs.

By changing the number of annular elements, the length of the tubular grip body, and of the whole handle in general, can be simply and quickly adjusted, and the handle can be thus customizable.

Advantageously, the modular annular elements may have at least one specially shaped lateral face adapted for engagement with a complementarily shaped lateral face of an adjacent element, for easy packing thereof along the longitudinal axis.

It shall be understood that the lateral faces may have any configuration, and include ridges and recesses to promote mutual engagement, without departure from the inventive scope as defined by the annexed claims.

It shall be further understood that the tubular body may be partly or wholly formed of the above mentioned modular elements, without departure from the inventive scope as defined in the annexed claims. For example, the tubular body may be a section of predetermined length with a plurality of modular elements connected thereto for adjusting the overall length as desired.

In a further aspect, the invention provides a sports implement as defined in claim 14, comprising a bar and grip means to be mounted to the bar, characterized in that the grip means include a handle structure as disclosed herein and claimed below.

BRIEF DESCRIPTION OF DRAWINGS

Further features and advantages of the invention will be more apparent from the detailed description of a preferred, non-exclusive embodiment of a handle structure according to the invention, which is described as a non-limiting example with the help of the annexed drawings, in which.

DETAILED DESCRIPTION OF A PREFERRED EMBODIMENT

Figure 1:
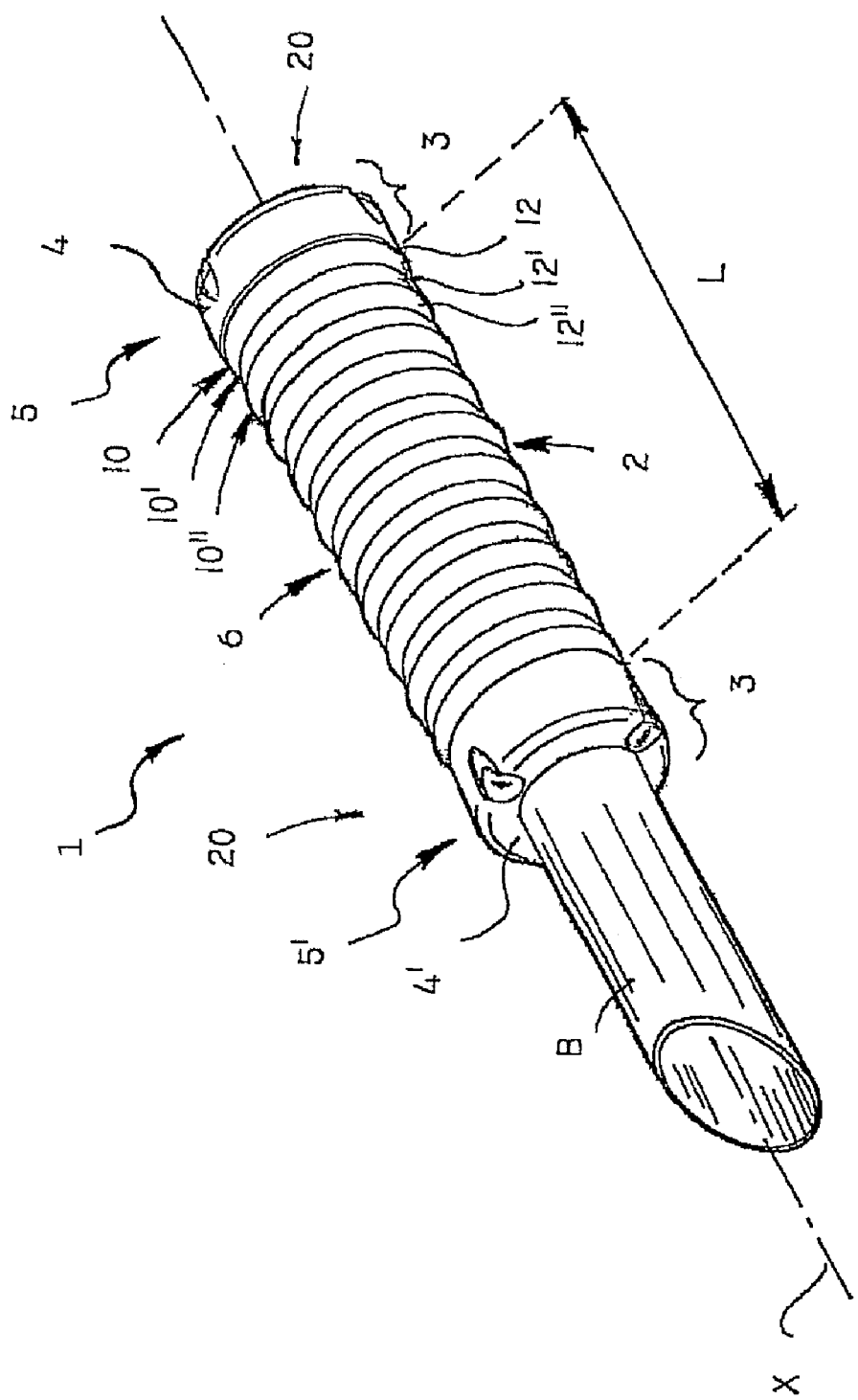
FIG. 1 is an axonometric view of a handle structure of the invention in an operating configuration.

Referring to the above figures, the handle structure of the invention, generally designated with numeral 1, is designed to be mounted to grip bars B of sports equipment, as shown in FIG. 1.

Basically, the structure 1 has a main tubular body 2 which defines a longitudinal axis X, and first means for axially locking it to the bar (B), generally designated by numerals 3, 3', comprising a pair of clamping rings 4, 4' at the longitudinal ends 5, 5' of the tubular body 2.

The latter has an outer surface susceptible of being grasped by a user and an inner surface 7 designed to be operably, i.e. during the normal designed use of the handle structure 1, attached to the bar B.

Figure 2:
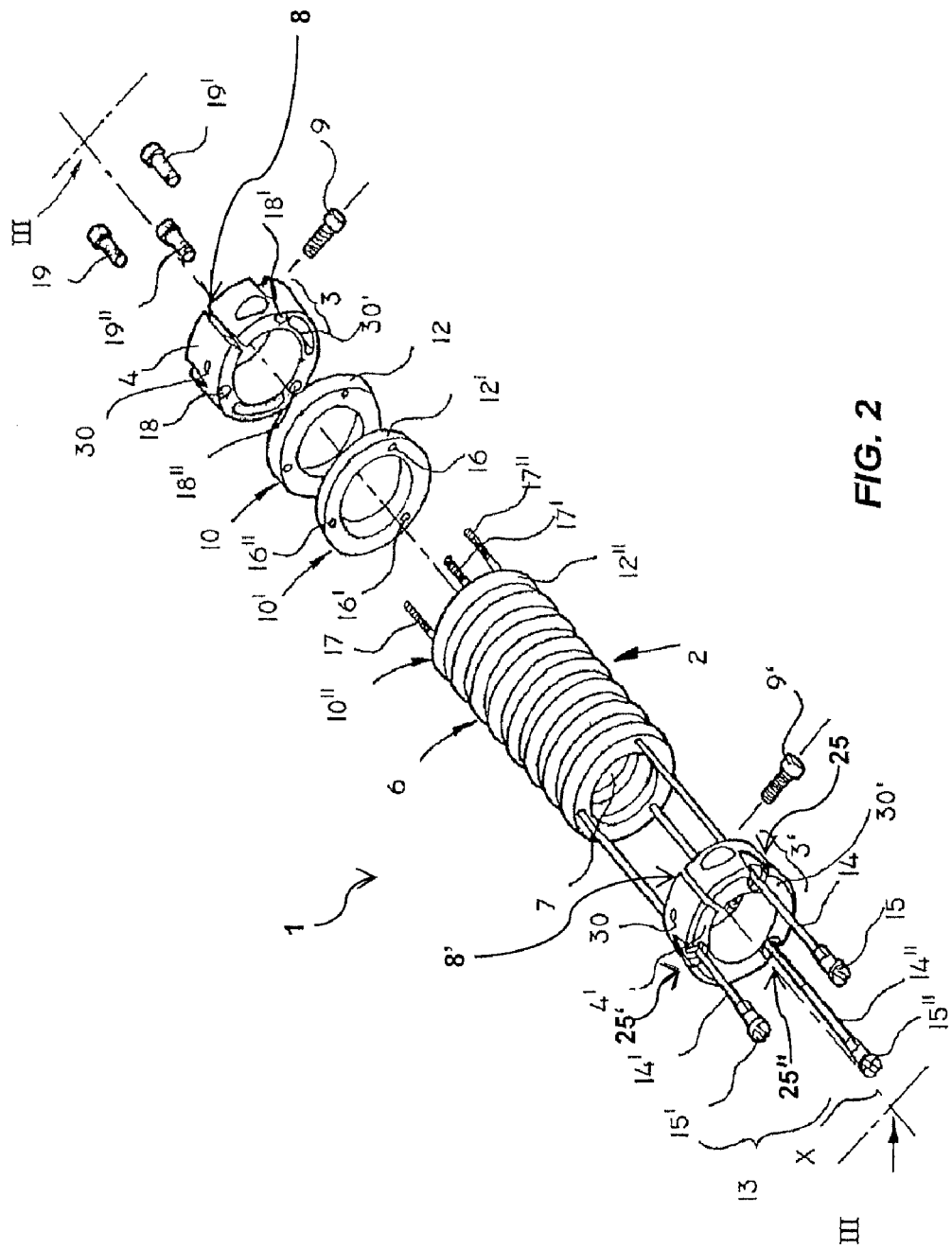
FIG. 2 is an axonometric view of a handle structure of the invention in an exploded configuration.

As particularly shown in FIG. 2, the clamping rings 4, 4' are of the open type with a substantially radial aperture 8, 8' closed by a substantially tangential screw 9, 9'.

The tubular body is formed of a plurality of modular annular elements 10, 10', 10'', designed for mutual coaxial connection along the longitudinal axis X for adjusting the overall length L of the body 2, thereby allowing customization of the handle structure 1 according to the needs of every single user. By changing the number of modular elements 10, 10', 10'', . . . the overall length L of the tubular body 2 may be adapted to the user hand size.

Figure 3:
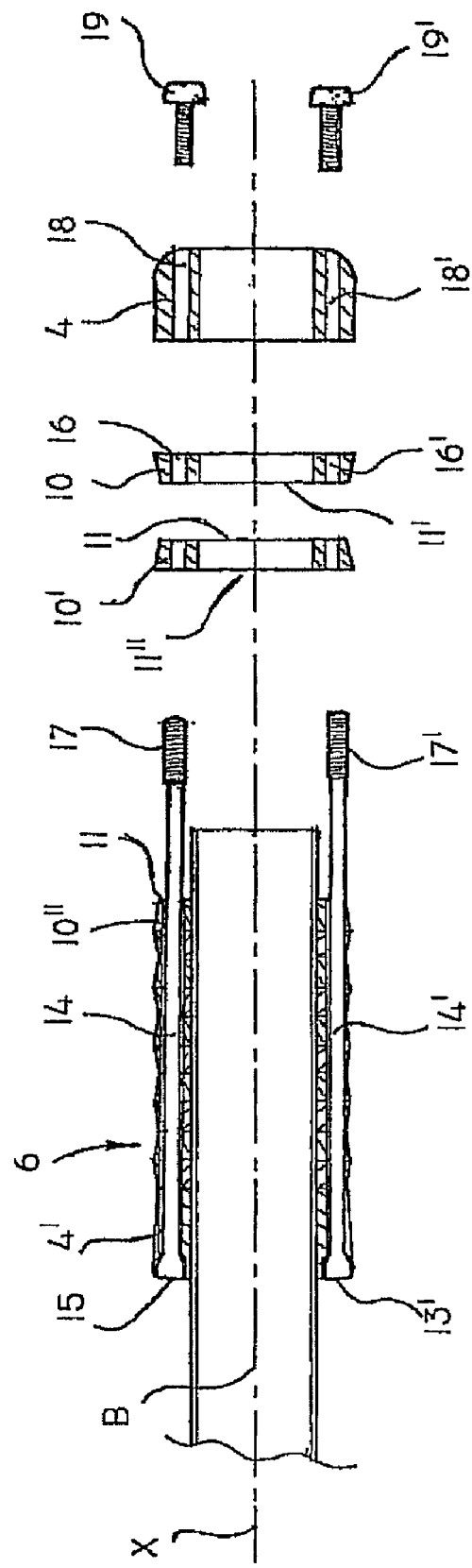
FIG. 3 is an exploded sectional view of the handle structure of FIG. 2, as taken along a plane III-III.

As particularly shown in FIG. 3, the annular elements 10, 10', 10'', have substantially flat opposite faces 11, 11' which are designed to matingly contact the faces 11'', 11''' of adjacent annular elements. Particularly, the face 11' of the element 10' will matingly contact the face 11''' of the element 10'', and the face 11 of the element 10' will matingly contact the face 11''' of the element 10.

Advantageously, the annular elements 10, 10', 10'' have substantially identical sizes. Nevertheless, it shall be understood that they may also have different sizes, without departure from the inventive scope as defined in the annexed claims.

For easy grasp by a user, each of the annular elements 10, 10', 10", has a cylindrical peripheral surface 12, 12', 12" easily graspable by a user. Nevertheless, it shall be understood that any other shape of the peripheral surface may be provided, without departure from the inventive scope as defined in the annexed claims.

Conveniently, the modular elements 10, 10', 10", may be wholly or partly formed of a material selected from the group comprising leather, imitation leather, thermoplastic polymer resins, gels.

In the preferred, non exclusive embodiment as shown in the figures, the clamping rings 4, 4' are attached to the annular elements 10, 10', 10", by second locking means, generally designated by numeral 13, comprising three substantially parallel rods 14, 14', 14", arranged at 120° from each other.

It shall be understood that the rods may be provided in different numbers and positions, without departure from the inventive scope as defined in the annexed claims.

Each rod 14, 14', 14" has a longitudinal end 15, 15', 15" attached to the clamping ring 4' by suitable holes 25, 25', 25" and is designed to be inserted in through holes 16, 16', 16" formed in each of the annular elements 10, 10', 10".

Each of the rods 14, 14', 14" has the other free end 17, 17', 17" threaded and designed to be inserted in corresponding holes 18, 18', 18" formed in the other clamping ring 4.

The rods 14, 14', 14" are fastened to the latter by screw means 19, 19', 19" which are designed for engagement with the threaded ends 17, 17', 17" to lock rotation of the body 2.

For improved design of the structure 1, the rods 14, 14', 14" may consist of portions of bicycle spokes, whereas the screw means 19, 19', 19" may consist of bicycle nipples.

Advantageously, the clamping rings 4, 4' have thinning means, generally designated by numeral 20, substantially diametrically opposite to the position of the apertures 8, 8'. These means will be adapted to create a "hinge effect" between the two half-rings 30, 30', thereby affording an optimal clamping effect on the bar B.

In the preferred, non exclusive embodiment that is shown in the figures, the thinning means 20 are defined by the through holes 18", 25".

Nevertheless, it shall be understood that any other configuration of the thinning means may be provided, without departure from the inventive scope as defined in the annexed claims.

The above disclosure clearly shows that the handle structure of the invention fulfills the intended purposes and particularly meets the requirement of providing a handle of varying length, which can meet the needs of every single user.

By providing a tubular body 2 formed of a plurality of modular annular elements 10, 10', 10", designed for mutual coaxial connection along the longitudinal axis X, for adjustment of the overall length L thereof, the handle structure 1 can be customized according to the needs of every single user.

The handle structure of this invention is susceptible of a number of changes and variants, within the inventive concept disclosed in the appended claims. All the details thereof may be replaced by other technically equivalent parts, and the materials may vary depending on different needs, without departure from the scope of the invention.

While the handle structure has been described with particular reference to the accompanying figures, the numerals referred to in the disclosure and claims are only used for the sake of a better intelligibility of the invention and shall not be intended to limit the claimed scope in any manner.

The invention claimed is:

1. A handle structure, comprising:
   a main tubular body which defines a longitudinal axis (X), and has an outer surface capable of being grasped by a user and an inner surface designed to be operably mounted to a bar (B),
   a first locking means including at least one pair of clamping rings for axially locking said main body to the bar (B) wherein said tubular body has a plurality of modular annular elements suitable to be mutually coaxially coupled along said longitudinal axis (X) for adjusting the overall length of said body and adapting the modular annular elements to each user's needs, wherein the clamping rings include a plurality of holes and are attached to the modular annular elements by a second locking means comprising at least one pair of substantially parallel rods, said rods having free threaded ends configured to be inserted into the holes formed in the clamping rings, and further comprising screw means configured for engaging said threaded ends of said rods within said holes formed in the clamping rings.

2. Structure as claimed in claim 1, wherein each of said modular annular elements comprise at least one lateral face for engagement with a lateral face of an adjacent modular annular element.

3. Structure as claimed in claim 1, wherein each of said modular annular elements have substantially flat opposite faces for contact coupling to the faces of adjacent modular annular elements.

4. Structure as claimed in claim 1, wherein said modular annular elements have substantially identical sizes.

5. Structure as claimed in claim 1, wherein each of said modular annular elements comprises a cylindrical peripheral surface for easy grasp by a user.

6. Structure as claimed in claim 1, wherein said modular annular elements are at least partly formed of a material selected from the group consisting of leather, imitation leather, thermoplastic polymer resins and gels.

7. Structure as claimed in claim 1, wherein said at least one pair of clamping rings are at the longitudinal ends of said tubular body.

8. Structure as claimed in claim 7, wherein each of said clamping rings is open and has a substantially radial aperture closed by a substantially tangential screw.

9. Structure as claimed in claim 8, wherein at least one of said clamping rings has thinning means substantially diametrically opposite to said aperture.

10. Structure as claimed in claim 9, wherein said thinning means comprises at least one through hole formed in said clamping rings.

11. Structure as claimed in claim 7, wherein said clamping rings at the longitudinal ends of said tubular body are attached to said annular elements by said second locking means for locking the rotation of said tubular body.

12. Structure as claimed in claim 1, wherein said at least one pair of substantially parallel rods includes a longitudinal end attached to one of said clamping rings and designed to be inserted in through holes formed in said annular elements.

13. Structure as claimed in claim 1, wherein the structure comprises three of said rods, arranged at 120° from each other.

14. A sports implement comprising a bar (B) and grip means to be mounted to said bar, wherein said grip means comprises a handle structure as recited in claim 1.

* * * * *